US009996405B2

(12) United States Patent
Liao et al.

(10) Patent No.: US 9,996,405 B2
(45) Date of Patent: Jun. 12, 2018

(54) EMBEDDED PROGNOSTICS ON PLC PLATFORMS FOR EQUIPMENT CONDITION MONITORING, DIAGNOSIS AND TIME-TO-FAILURE/SERVICE PREDICTION

(71) Applicant: Siemens Corporation, Orlando, FL (US)

(72) Inventors: Linxia Liao, Mountain View, CA (US); Ertan Eligul, Bagcilar (TR); Zachery Edmondson, Los Angeles, CA (US)

(73) Assignee: Siemens Corporation, Iselin, NJ (US)

( * ) Notice: Subject to any disclaimer, the term of this patent is extended or adjusted under 35 U.S.C. 154(b) by 604 days.

(21) Appl. No.: 14/391,268

(22) PCT Filed: Apr. 12, 2013

(86) PCT No.: PCT/US2013/036382
§ 371 (c)(1),
(2) Date: Oct. 8, 2014

(87) PCT Pub. No.: WO2013/155421
PCT Pub. Date: Oct. 17, 2013

(65) Prior Publication Data
US 2015/0073751 A1     Mar. 12, 2015

Related U.S. Application Data

(60) Provisional application No. 61/623,647, filed on Apr. 13, 2012.

(51) Int. Cl.
| G06F 19/00 | (2018.01) |
| G06F 11/00 | (2006.01) |
| G05B 19/05 | (2006.01) |

(52) U.S. Cl.
CPC ............ *G06F 11/00* (2013.01); *G05B 19/058* (2013.01)

(58) Field of Classification Search
CPC .. G06Q 30/02; G06Q 30/08; G06F 17/30867; G06F 3/011
(Continued)

(56) References Cited

U.S. PATENT DOCUMENTS

| 6,326,758 B1 | 4/2001 | Discenzo |
| 6,789,030 B1 * | 9/2004 | Coyle ................... G01D 9/005 |
| | | 702/182 |

FOREIGN PATENT DOCUMENTS

| CN | 101436047 A | 5/2009 |
| CN | 102262690 A | 11/2011 |

(Continued)

OTHER PUBLICATIONS

Translation of Chinese Office Action dated Apr. 6, 2016 corresponding to Chinese Application No. 201380029303.X filed Apr. 12, 2013 (11 pages).

*Primary Examiner* — Edward Raymond (57) ABSTRACT

A prognostics analysis software module is embedded in a programmable logic controller (PLC) software platform. During cycling of the PLC real-time operating program, data is read from sensors and written to a buffer only when the prognostics analysis software module is idle. The prognostics analysis software module is then activated by a system function block of the PLC software platform. Before determining any prognostic information, prediction models within the prognostics analysis software module are automatically trained using features extracted from the sensor data.

14 Claims, 9 Drawing Sheets

(58) Field of Classification Search
USPC .................................. 702/185, 182–184, 188
See application file for complete search history.

(56) References Cited

FOREIGN PATENT DOCUMENTS

| | | |
|---|---|---|
| JP | 2010160582 A | 7/2010 |
| JP | 5207987 B2 | 6/2013 |
| WO | 20050038613 A2 | 4/2005 |

* cited by examiner

Fig. 7a Balanced

Fig. 7b 1 screw near

Fig. 7e 2 screw far

Fig. 7d 2 screw near

Fig. 7c 1 screw far

EMBEDDED PROGNOSTICS ON PLC PLATFORMS FOR EQUIPMENT CONDITION MONITORING, DIAGNOSIS AND TIME-TO-FAILURE/SERVICE PREDICTION

CLAIM OF PRIORITY

This application claims priority to, and incorporates by reference herein in its entirety, U.S. Provisional Patent Application Ser. No. 61/623,647, filed Apr. 13, 2012, and entitled "Embedded Prognostics on PLC Platforms for Equipment Condition Monitoring, Diagnosis and Time-to-Failure/Service Prediction."

FIELD OF THE INVENTION

This invention relates generally to techniques for machine monitoring. More particularly, the invention relates to embedding prognostics analysis software in a programmable logic controller platform to perform equipment prognosis.

BACKGROUND OF THE INVENTION

Unexpected downtime remains an important issue impacting productivity and total cost of ownership in the manufacturing industry. Early detection of emerging faults and degradation trends can prevent downtime, target maintenance efforts, increase productivity and save costs. Condition-based maintenance systems in manufacturing plants continuously deliver data related to the machine's status and performance, but the challenge for field engineers and management staff is making effective use of the huge amount of data to accurately detect equipment degradation.

SUMMARY OF THE INVENTION

To address the aforementioned issues, the present disclosure proposes a technology to add local data processing capability to programmable logic control (PLC) systems for prognostics. The proposed system can potentially be applied to broader applications. The proposed system utilizes the computational power (e.g., multi-core CPU) of modern PLC platforms to provide equipment prognostics information as a value-added function. The system adapts to various operating conditions/usages and is capable of identifying and diagnosing equipment faults during regular operations with minimum human intervention. Before a major failure occurs, the system alerts the user of the need for maintenance to be performed, using PLC diagnosis messages or simple physical indicators such as lighting. Multi-sensory data are collected (synchronously or asynchronously) in the background during regular operation and are converted to a single-digit health indicator through a set of data analysis algorithms. If the health indicator exceeds a statistical/predefined threshold, diagnosis and prediction functions are triggered to determine the type of fault and/or potential remaining useful life or time to service.

Presently disclosed is a method for determining prognostic information for equipment controlled by a programmable logic controller. The method utilizes a prognostics analysis program embedded in a software platform of the programmable logic controller. A determination is made whether the prognostics analysis program has an idle status. If so, then, by the programmable logic controller during programmable logic controller real-time cycles, a predetermined number of data samples are read from a data acquisition device and the data samples are written to a buffer.

A system function block of the programmable logic controller software platform then activates the prognostics analysis program to have an active status. The data samples are read from the buffer into the prognostics analysis program. An operating condition of the equipment is identified based on the data samples from the buffer, and, based on the operating condition of the equipment, a plurality of features are extracted from the data samples from the buffer.

A determination is made whether a model corresponding to the identified operating condition has been trained and, only if the model has been trained, the model is used in determining the prognostic information based on the features. After determining the prognostic information, the prognostics analysis program status is set to idle.

In another aspect of the invention, a non-transitory computer-usable medium is provided having computer readable instructions stored thereon for execution by a processor to perform operations for determining prognostic information for equipment controlled by a programmable logic controller, using a prognostics analysis program embedded in a software platform of the programmable logic controller, as described above.

In another aspect of the invention, a programmable logic controller is provided having a prognostics analysis program embedded in a software platform of the programmable logic controller, as described above.

DESCRIPTION OF THE INVENTION

Many challenges remain in adapting prognostics algorithms to the numerous types of equipment and applications in use, without requiring significant effort to implement each case. Further challenges exist in bringing prognostics solutions closer to the equipment to ensure information is delivered to the right people at the right time.

For example, current approaches may use a condition monitoring server, remote from the PLCs, where the actual calculation is performed. A large amount of data must be transferred from the PLCs to remote computers for information processing. That data transfer may incur network traffic problems as well as extensive costs in storing and maintaining large amounts of data. Moreover, the lag of the data transfer may delay the information processing and lead to a lag of maintenance decision-making.

The system described herein delivers simple, reliable machine diagnostics and prognostics information to the equipment users. A key requirement of the technology is that it should generate this information without custom machine modeling, custom parameterization, or special machine test cycles—that is, as close to "plug and play" as possible. The development of prognostics solutions on embedded PLC platforms brings the analysis functions closer to the equipment, targeting broader applications with lower cost controllers.

Figure 1:
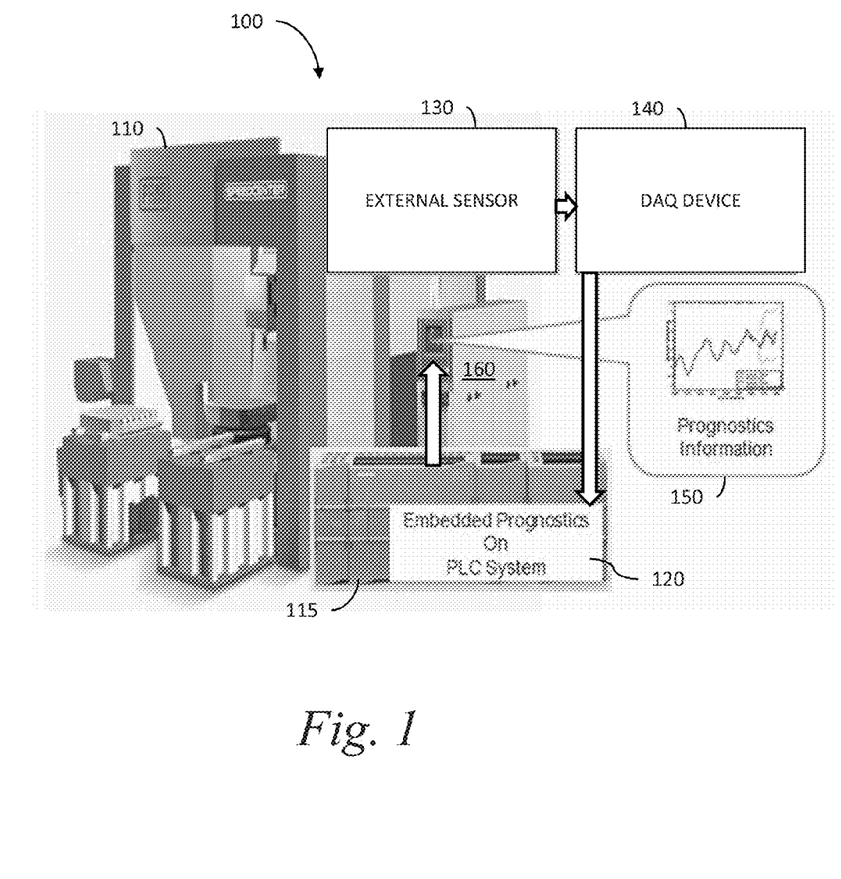
FIG. 1 is a schematic diagram showing operation of a PLC with embedded prognostics according to one embodiment of the invention.

A basic concept of the prognostics solution on embedded PLC platforms is illustrated by the system 100 shown in FIG. 1. External sensors 130 measure attributes relating to the equipment 110 or its environment. The equipment may, for example, be a machining center as shown. A broad range of sensors types may be chosen by the customer.

Sensor measurements are read by a data acquisition device (DAQ) 140 that conditions and/or compiles the data. A broad range of data acquisition device types may also be chosen by the customer. Data is periodically transferred from the data acquisition device 140 to an embedded prognostics analysis program 120 on the PLC system 115. Results 150 computed by the prognostics analysis program 120 are then transferred to a man-machine interface (MMI) or storage 160. The prognostics analysis program results are available locally to machine operators, etc. Because the analysis takes place locally, there is no need to transport large amounts of measurement data through the factory network.

Methodology

The prognostics functions are integrated into a PLC platform. The integrated system collects data from sensors using the PLC input modules and/or third-party devices and/or internal sensor signals. The system automatically converts data to prognostics information using an embedded prognostics library.

Figure 2:
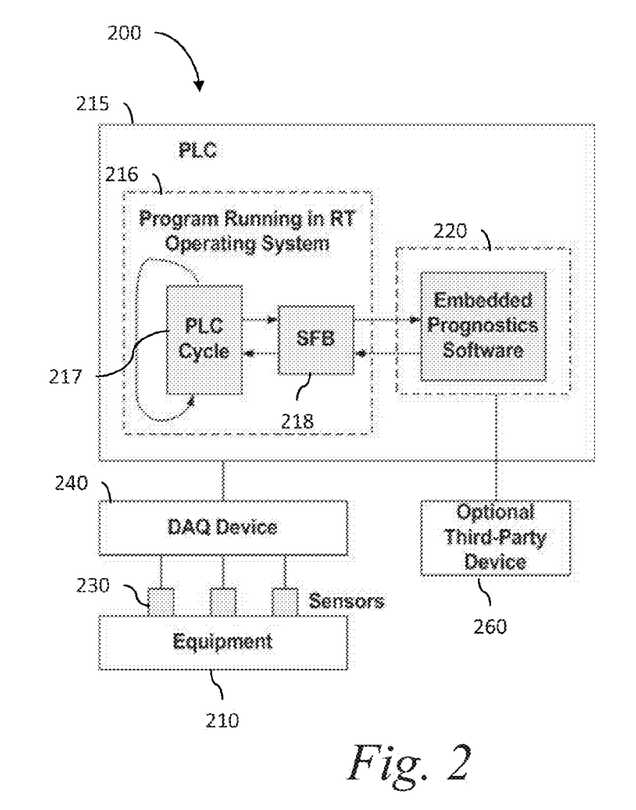
FIG. 2 is a block diagram showing a PLC with embedded prognostics according to an embodiment of the invention.

The following acronyms are used in the present disclosure:
WinAC—Windows automation center
RT—Real-time
RTX—Real-time extension
ODK—Open development kit
OB—Organizational block
DB—Data block
CCX—Custom code extension
DLL—Dynamic-link library
RTDLL—Real-time dynamic-link library
WinLC—Windows logic controller
SFB—System function block
DAQ—Data acquisition
AI—Analogue input
DI—Digital input
SOM—Self-organizing maps
System Structure A PLC system 200 in accordance with the present disclosure is shown in FIG. 2. The system comprises a PLC 215 running at least two programs: a program 216 running in the real-time operating system of the PLC, and embedded prognosis software 220. A PLC cycle program 217 runs cyclically from the real-time operating system program 216. The PLC cycle program 217 collects data from the DAQ device 240 which is connected to sensors 230 installed on the equipment 210. The PLC cycle program 217 can also collect data from internal sensors. The PLC cycle can execute regular or high speed cycles depending on the requirement of sampling frequency. Multiple PLC cycles can be used to collect data under different sampling frequency requirements.

When a preset number of data samples is collected, a system function block 218 is initialized to activate the embedded prognostics software 220 and to transfer the data in buffer to the prognostics software 220. The prognostics analysis software 220 processes the received data. The prognostics analysis software is implemented as a plug-in software component such as in DLL format. It also provides opportunity to use a third-party device 260, such as a commercial industrial man-machine interface.

Figure 3:
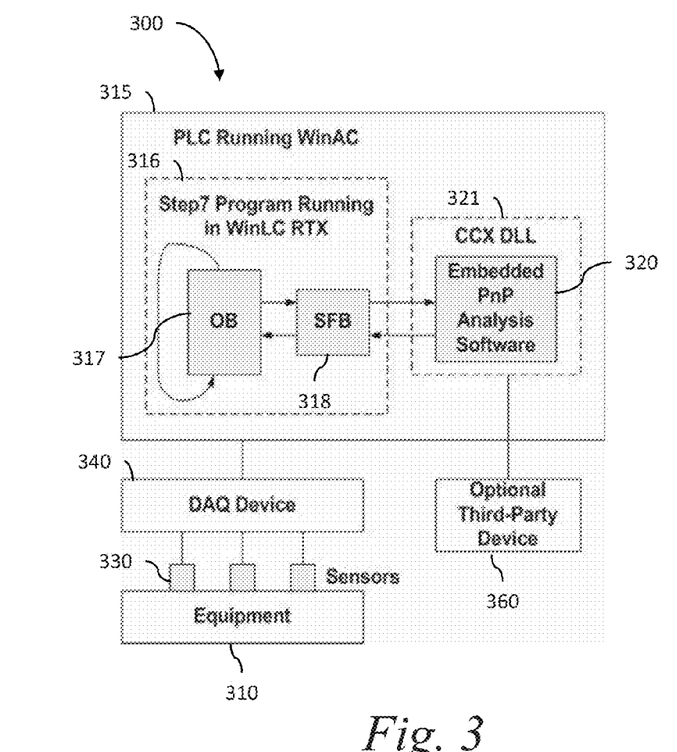
FIG. 3 is a block diagram showing a particular configuration of a PLC with embedded prognostics according to an embodiment of the invention.

An example implementation 300 of the system structure 200 (FIG. 2) on a Siemens PLC system 315 running WinAC is shown in FIG. 3. The organizational blocks 317 run cyclically from the Step 7 program 316 running in WinLC real time extension. The program in the organizational blocks 317 collects data from the DAQ device 340 which is connected to sensors 330 installed on the equipment 310.

When a preset number of data samples is collected, a system function call is initialized to call a custom code extension (CCX) function 321 in the dynamic link library to transfer the data in the Step 7 buffer to Siemens PnP analysis software 320. The Siemens WinAC ODK CCX provides tools to implement a DLL or RTDLL from a high-level programming language environment. The PnP analysis software 320 is implemented using CCX DLL (in C++ language) to process the received data. It also may provide interfacing to use a third-party device 360 in the CCX DLL.

Program Flowchart

Figure 4:
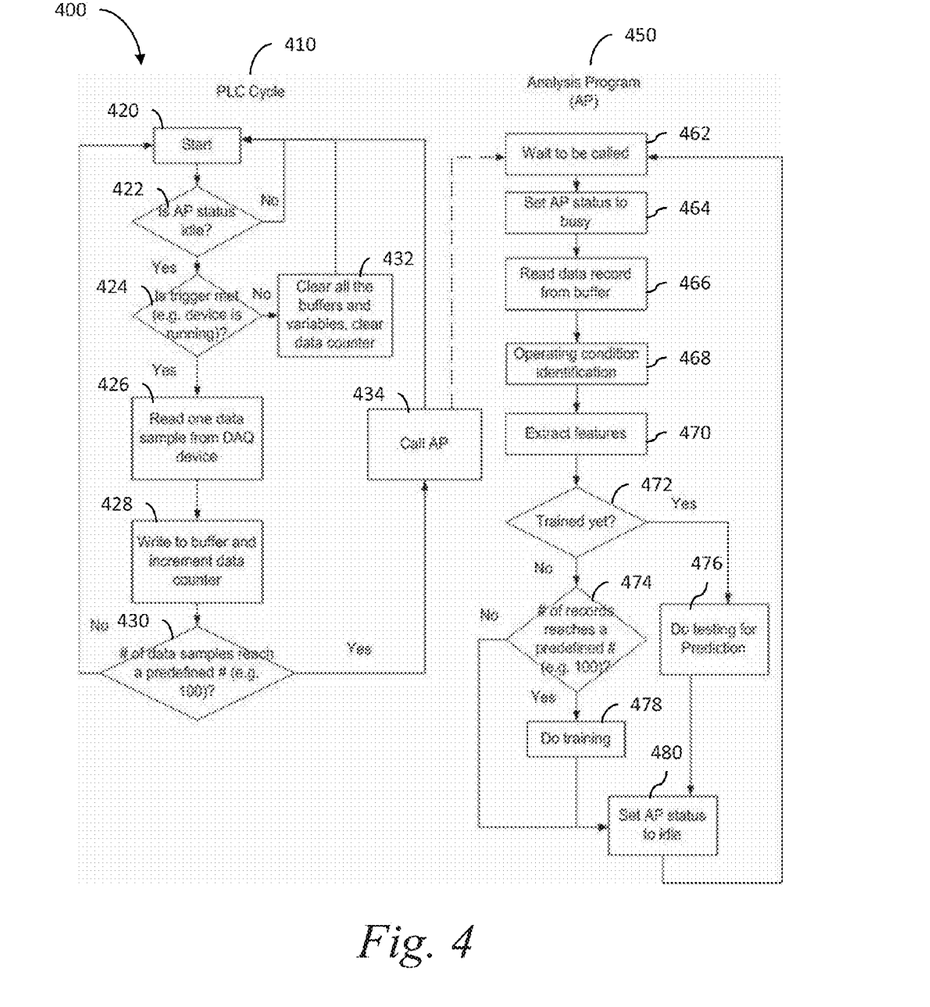
FIG. 4 is a flow chart showing a method in accordance with one embodiment of the invention.

A flowchart 400 showing the operation of a system integrating the PLC cycle program 410 and the analysis program (AP) 450 is shown in FIG. 4. The left-hand side represents the PLC cycle program 410 and the right-hand side represents the AP 450.

In the PLC cycle program 410, data acquisition is the primary task. The program starts at 420, and data acquisition proceeds only when the AP is idle (decision 422). By requiring the AP program to be idle before cycling the data acquisition routine, the system assures that adequate processing resources are available in the PLC because only one of the data acquisition cycle and the AP run at any given time. The requirement also synchronizes the relatively fast data acquisition cycle with the relatively slow analysis program, preventing the former from overwhelming the latter with data.

Data acquisition further proceeds only when the DAQ trigger condition (e.g. equipment is running or operational) is met (decision 424), avoiding the collection and analysis of meaningless or null data.

In each PLC cycle, the program reads (operation 426) one data sample from the DAQ device (and/or third-party device) and writes (operation 428) the data sample into the PLC buffer created in the PLC data blocks. The data counter is increased when a data sample is read. When the number of the collected data samples reaches a predefined threshold (e.g. 100) (decision 430), the PLC program stops data collection and calls AP (operation 434) to transfer the data. If either of the trigger conditions 422, 424 is no longer met before the predefined threshold is reached (decision 430), the data buffer is cleared and data counter is reset (operation 432). The PLC program starts to wait (operation 420) until the trigger condition is met.

The AP 450 is responsible for analyzing data and generating prognostics information. Once the AP is called (operation 462) by the PLC program, it sets the AP status to busy (operation 464) so that the PLC program stops reading data. The AP reads the data record (containing multiple data samples) saved in the PLC buffer (operation 466), and applies operating condition identification (operation 468) and then signal processing algorithms to extract features (operation 470) from the raw data. Before the AP starts predicting, it is determined whether a baseline has been trained based on a predefined number (e.g. 100) of data records (decision 474). If the model has not been trained and if the predefined threshold is not met (decision 474), the AP saves the extracted features into a data array and sets AP status to idle (operation 480) to wait for more data records to come.

When the predefined number of data records is reached (decision 474), the AP applies the training algorithm (operation 478) to train a baseline base on the saved data array which contains all the extracted features. After a baseline is trained (decision 472), the AP applies the testing algorithm and outputs prediction results (operation 476) when new data arrives. In terms of a specific implementation, for example, the AP is in CCX DLL format if implemented on a Siemens PLC system running WinAC.

Embedded Prognostics Library—Data Analysis Software

Figure 5:
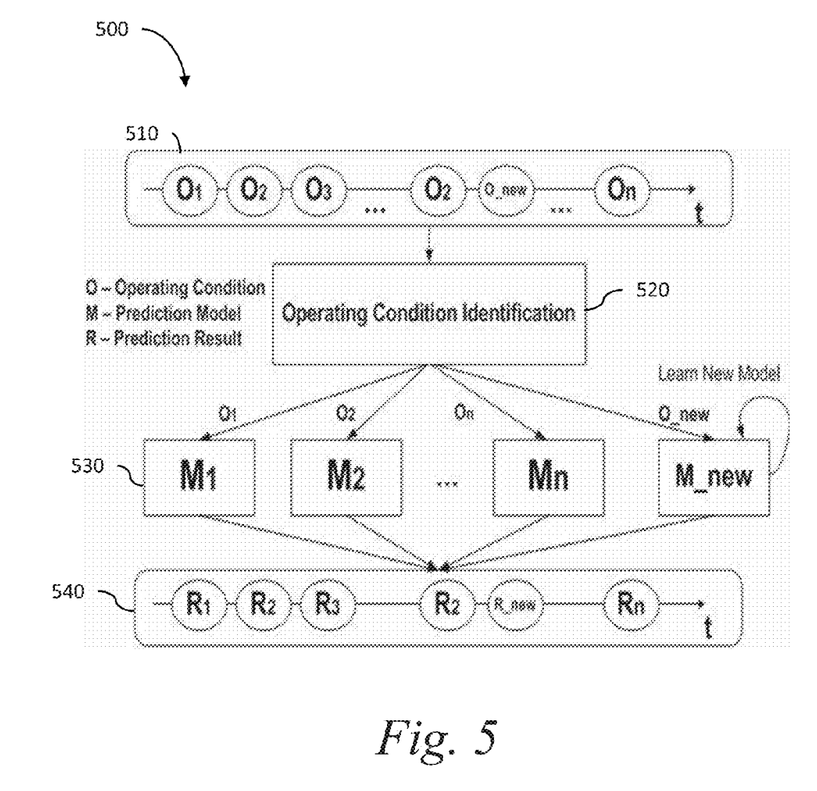
FIG. 5 is a schematic block diagram illustrating a data processing schema according to an embodiment of the invention.

An overview data analysis flowchart 500 in accordance with the present disclosure is shown in FIG. 5. In many cases, the operating condition $O_n$ of a piece of equipment is alternating over time (block 510) due to different usages of the machine. The operating condition can be determined (block 520) by a single variable such as speed, voltage, and direction, or can be determined using a combination of multiple variables. If the operating condition has already existed ($O_1 \ldots O_n$) the measurement data is input to the prediction model 530 ($M_1 \ldots M_n$) associated with the operating condition to generate prediction result ($R_1 \ldots R_n$). If an operating condition has never been encountered in the past, a new operating condition $O\_{new}$ is created and the associated prediction model $M\_{new}$ is trained when a predefined number of data records are collected. Once the prediction model is trained, it can start generating prediction results. The prediction results are organized (block 540) according to the sequence of the appearance of the operating condition over time (block 510).

An example of the data analysis flow for anomaly detection and fault diagnosis of industrial machine tools is given as follows. The algorithms used in the prediction model associated with one operating condition $O_n$ are indicated by $M_n$ in FIG. 5. The specific algorithms in the prediction model can be customized for different applications.

After raw data is taken from the data acquisition device under a particular operating condition, a "most stable window" from each data record is selected to avoid noise that may change quickly over time in the time domain and/or to avoid dramatic frequency changes. Then, a fast Fourier transform (FFT) is applied to decompose the signal into its component frequencies and their amplitudes. Band energies are calculated within equally distributed frequency ranges along the FFT spectrum. A wavelet packet transform represents a signal in terms of a waveform (known as a mother wavelet) with a finite length or fast decaying oscillating characteristic. Energies are calculated for all the nodes at the end of the decomposition level to reveal unusual frequency changes that may introduced by potential faults at different resolutions. Time domain feature extraction is also applied to the selected data segment to calculate statistics such as mean, standard deviation, Root Mean Square (RMS) and kurtosis, etc. After all the aforementioned features are extracted, they are used as input to self-organized maps (SOM) for anomaly detection or diagnosis purposes.

More detail about the mathematic background of the algorithms may be found in L. Liao and R. Pavel, "Machine Anomaly Detection and Diagnosis Incorporating Operational Data Incorporating Operational Data Applied to Feed Axis Health Monitoring," ASME 2011 International Manufacturing Science and Engineering Conference, Corvallis, Oreg., USA, 2011, the contents of which is incorporated by reference herein.

Experiment and Result

This section demonstrates the concept of the embedded prognostics system using a motor test bed to test anomaly detection and diagnosis functions.

Experiment Setup

Figure 6:
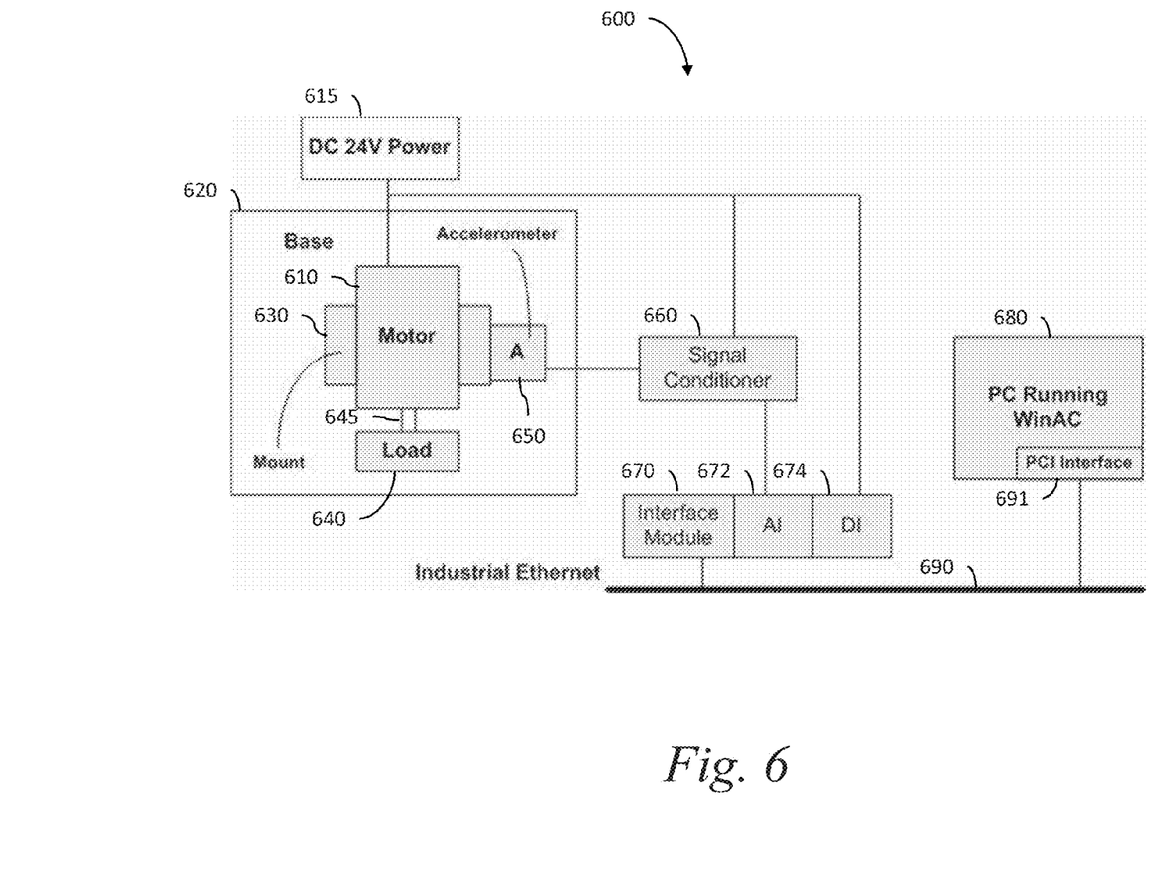
FIG. 6 is a block diagram showing a test bed for testing a system in accordance with one embodiment of the invention.
Figure 7A:
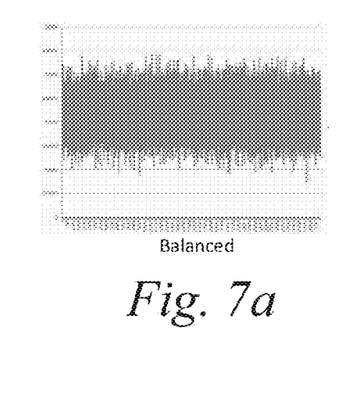
FIGS. 7a, 7b, 7c, 7d and 7e are plots of raw vibration data produced in testing a system in accordance with one embodiment of the invention.
Figure 7B:
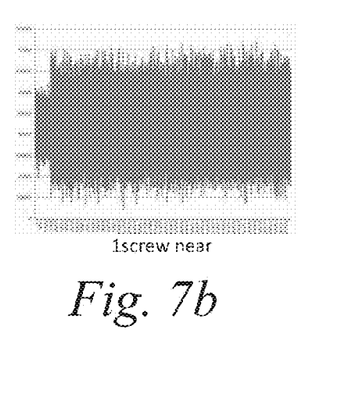
Figure 7C:
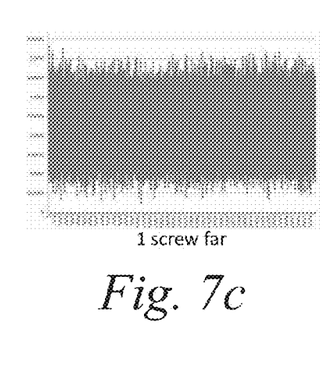
Figure 7D:
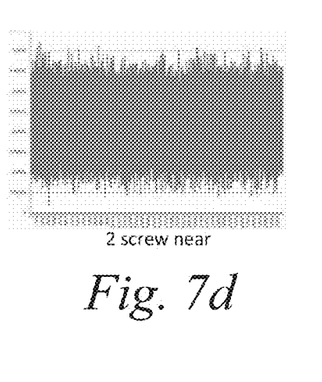
Figure 7E:
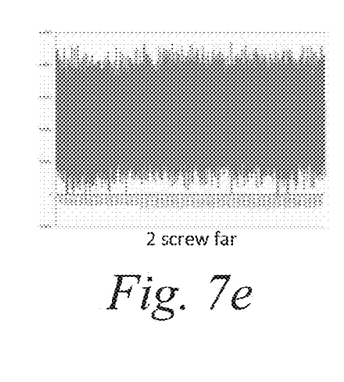

For the test bed 600, shown in FIG. 6, a Maxon dc motor 610 (A-max 26), a rubber wheel (loading) 640 and coupling 645 are assembled. A mount 630 is designed to support the motor on a base 620. The motor is powered with a 24 VDC power supply 615. An accelerometer 650 (IMI PCB 624B61) is installed on the housing of the motor 610. The output range of the accelerometer 650 is between −5 and +5 volts. The data is conditioned using a signal conditioner 660 (IMI 682A02) which provides 4 mA current excitation to the accelerometer and an output of the original signal on the scale of 1:1. The data is taken at a sampling frequency 1 kHz (OB's cycle is set to 1 ms) using regular AI module 672 (e.g. AI 2×12 bit 6ES7 331-7 KB02-0AB0; higher data conversion speed of 52 μs can be achieved using high speed AI module, e.g. AI 8×14 bit 6ES7 331-7HF01-0AB0). The DI module 674 (DI 16×DC24V 6ES7 321-1BH02-0AA0) is used to detect the running or operating state (on/off) of the motor 610. The AI and DI modules are connected to an interface module 670 (IM513-4PN 6ES7 153-4AA00-0XB0) which is connected to the industrial Ethernet 690. A PC 680 (can be replaced by a PC based controller) on which WinAC is running is connected to the industrial Ethernet 690 via a PCI interface card 691 (CP1616-CP1604).

Introduce Faults

In order to test the anomaly detection and diagnosis functions, imbalance faults were introduced manually to the motor test bed. Small screws were installed on various angular locations of a wheel flange that rotates with the shaft. As the location of the screw changes, the imbalance patterns change as well. The purpose of the test was firstly to detect whether there is an imbalance situation (using unsupervised learning) and secondly to differentiate various imbalance patterns (using supervised training) when an imbalance situation appears. It was noticed that there exists misalignment inherent in the installation. The misalignment existed in all balanced and imbalanced situations. The algorithms were able to detect the imbalanced patterns despite the misalignment.

The manually introduced imbalance patterns on the motor test bed include (a) no imbalance screws installed ("balanced"), (b) one screw installed on the flange angularly close to the set screw used to fix the flange to the shaft ("1 screw near"), (c) one screw installed angularly opposite (approximately 180 degrees from) the set screw ("1 screw far"), (d) two screws installed close to the set screw ("2 screw near"), (e) two screws installed opposite the set screw ("2 screw far"). 'Near' and 'far' are both relative to the position of the set screw.

Results

The motor was run approximately 500 seconds for each different imbalance situation, and the data was collected using the AI module. 500 data records are generated randomly into segments of 4096 data samples from the 500 seconds' data. The raw vibration data under different balanced and imbalanced situations is shown in FIGS. 7a through 7e. It is not simple to differentiate the imbalance situations by looking only at the time domain signals. The rotation speed of the motor was selected as determining the operating condition. To be simple, the motor was run at a constant speed, creating only one operating condition. The following analysis is within that specific operating condition.

For the data sets shown in FIGS. 7a through 7e, the energy of 10 frequency bands equally distributed in the FFT spectrum, time domain features (including mean, RMS, and crest factor, variance and skewness, standard deviation and kurtosis) and wavelet packet energies were extracted. Two energies centered at 167 Hz (motor rotating speed) and 334 Hz within 20 Hz ranges in the FFT spectrum were extracted as features as well.

Anomaly detection—unsupervised test results: Data was collected from each fault situation. For testing, 80 different records were used. Each data record contained 4092 data samples. There were 5 different imbalance situations tested. For that test, 2 energy features and 6 time domain features were selected as features to input to the anomaly detection algorithm.

A self-organizing map (SOM) was trained with only balanced data, which was used as the baseline. The map was then tested with other data collected in situations of 1screwNear, 1screwFar, 2screwNear and 2screwFar.

Figure 8:
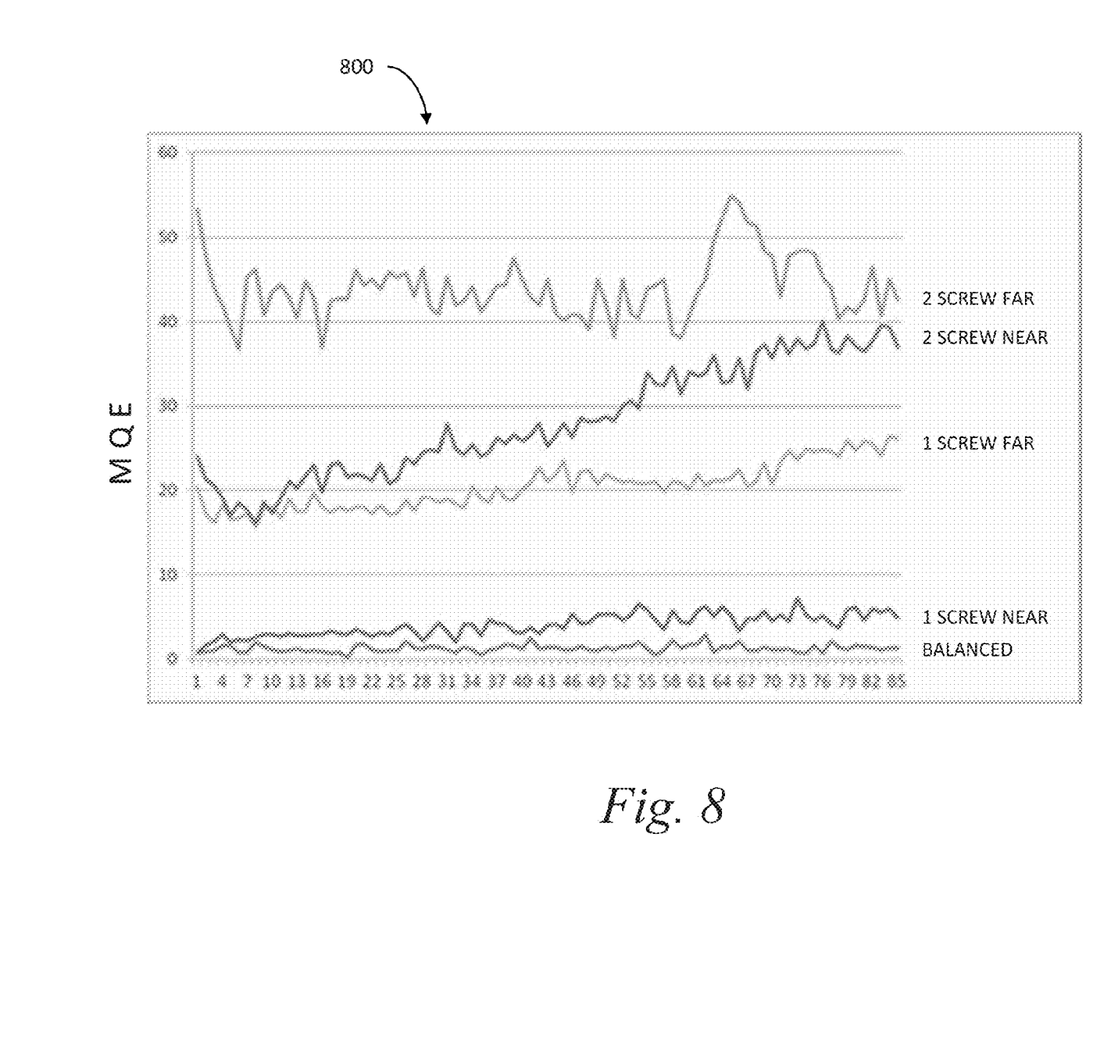
FIG. 8 is a plot showing a calculated deviation from baseline for several test runs using the test bed of FIG. 6.

The results show that when the balanced situation is trained as the baseline, the 2screwFar imbalanced fault creates the biggest difference. FIG. 8 shows the distances of different imbalances to the baseline, which differentiating 4 types of imbalance situations with the balanced situation using the output of the SOM (MQE is an indicator of deviation from baseline).

A possible explanation of the increasing the distance (MQE) of class '2screwNear' is that the data might not be taken in a perfect environment due to the non-fixed mounting to the ground. However, the different levels of imbalance can still be well differentiated. In order to predict the label of each data record, the following supervised test (diagnosis) is carried out.

Diagnosis—supervised test results: The same data sets of unsupervised test are used for diagnosis except for the 1screwNear data set. The reason the 1screwNear data set is not used is that it is very close to the baseline. When examining the signals and their properties, it turns out that there is nearly no difference between 1screwNear and the balanced situation. That is why it is discarded from the test. The diagnosis test with supervised training is therefore done with 4 classes: balanced, 1screwFar, 2screwNear, 2screwFar.

In the test, a cross validation method is applied. Four folds are created and each fold contains 80 data records. These data records are composed of 4 classes, which are the imbalanced situations. In each test, a SOM map is trained with 3 folds and the remaining fold is tested.

The following features are used as input to the supervised SOM algorithm: Energies centered at the 2nd, 3rd, 4th and 6th of the running speed within a 20 Hz band, crest factor of the signal and standard deviation of the signal. There are therefore 6 features for each data record. When the signal coming from the motor is examined, peaks can be seen at the frequency of 167 Hz and its multiples, which means at that frequency is dominated. In order to reduce the error due to resolution issue, the range is chosen 20 Hz which means 167+/−20 Hz. The energies represent those values. For example, the 2nd energy includes the energies between frequency 167*2−20 Hz and 167*2+20 Hz; the 3rd energy is between 167*3−20 Hz and 167*3+20 Hz; and so on.

The program can predict the classes with an accuracy of 95% in the cross validation tests.

System

Figure 9:
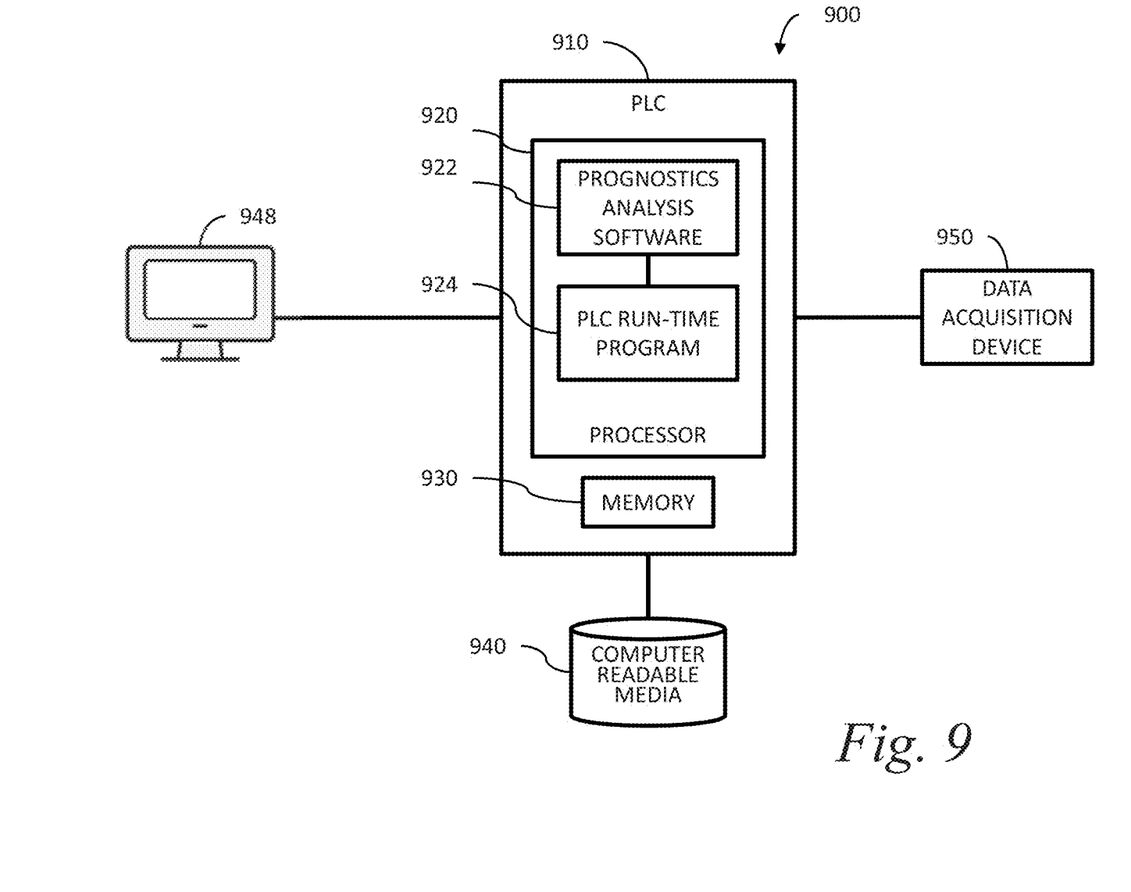
FIG. 9 is a schematic block diagram of a data processing system in accordance with one embodiment of the invention.

The elements of the methodology as described above are implemented in a programmable logic controller (PLC) computer system. An exemplary system 900 is shown in FIG. 9.

The PLC 910 is preferably a commercial industrial unit capable of collecting data cyclically from internal or external sensors and processing that data. The PLC may further be capable of controlling equipment using the collected data. The PLC 910 may receive the data through a data acquisition device 950 or directly from sensors (not shown).

Input/output data may be passed between the PLC 910 and a man-machine interface (MMI) 948 via a wide area network such as the Internet, via a local area network or via a direct bus connection. The PLC 910 may be configured to operate and display information by using, e.g., the MMI 948 to execute certain tasks. In one embodiment, data acquisition is initiated via the MMI 948, and prognostic results are displayed to the user via the same device.

The PLC 910 includes one or more processors 920 such as a central processing unit (CPU) and further includes a memory 930. The processor 920, when configured using software according to the present disclosure, includes a prognostics analysis software module 922 that is configured for performing one or more methods for determining prognostic information for equipment controlled by the PLC 910, as discussed herein. Those modules include a PLC run-time program 924 that collects data from external sensors and may also transmit machine control commands to the controlled equipment.

The memory 930 may include a random access memory (RAM) and a read-only memory (ROM). The memory may also include removable media such as a disk drive, tape drive, memory card, etc., or a combination thereof. The RAM functions as a data memory that stores data used during execution of programs in the processor 920; the RAM is also used as a program work area. The ROM functions as a program memory for storing a program executed in the processor 920. The program may reside on the ROM or on any other tangible or non-volatile computer-readable media 940 as computer readable instructions stored thereon for execution by the processor to perform the methods of the invention. The ROM may also contain data for use by the program or by other programs.

Generally, the program modules 922, 924 described above include routines, objects, components, data structures and the like that perform particular tasks or implement particular abstract data types. The term "program" as used herein may connote a single program module or multiple program modules acting in concert. The disclosure may be implemented on a variety of types of computers, including dedicated PLCs, personal computers (PCs), hand-held devices, multi-processor systems, microprocessor-based programmable consumer electronics, network PCs, mini-computers, mainframe computers and the like. The disclosed technique may also be employed in distributed computing environments, where tasks are performed by remote processing devices that are linked through a communications network. In a distributed computing environment, modules may be located in both local and remote memory storage devices.

An exemplary processing module for implementing the methodology above may be hardwired or stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art.

The term "computer-readable medium" as employed herein refers to any tangible machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. Such media excludes propagated signals, which are not tangible. Cached information is considered to be stored on a computer-readable medium. Common expedients of computer-readable media are well-known in the art and need not be described in detail here.

CONCLUSION

The present disclosure describes a system and method including embedded equipment prognostics (anomaly detection, diagnosis and time-to-failure/service prediction) analysis functions on PLC platforms. The systems collects data from the sensors installed on a device using the PLC input modules in the PLC cycle program. Prognostics analysis software is implemented as plug-in software components such as DLLs to be called by the PLC cycle program after data is collected. The system has been demonstrated using a motor test-bed, and was shown to successfully detect and identify anomaly situations of different imbalance faults on the motor loading. The system can be potentially applied to a variety of applications including but not limited to machine tool components (e.g. motor, gearbox, and bearing), gas/wind turbines and trains.

The foregoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

What is claimed is:

1. A method for determining prognostic information for equipment controlled by a programmable logic controller, using a prognostics analysis program embedded in a software platform of the programmable logic controller, the method comprising:
   determining whether the prognostics analysis program has an idle status;
   only if the prognostics analysis program has an idle status, then, by the programmable logic controller during programmable logic controller real-time cycles, reading a predetermined number of data samples from a data acquisition device and writing the data samples to a buffer;
   after writing the predetermined number of data samples to the buffer, activating, by a system function block of the programmable logic controller software platform, the prognostics analysis program to have an active status;
   reading the data samples from the buffer into the prognostics analysis program;
   identifying an operating condition of the equipment based on the data samples from the buffer;
   based on the operating condition of the equipment, extracting a plurality of features from the data samples from the buffer;
   determining whether a model corresponding to the identified operating condition has been trained;
   if the model corresponding to the operating condition is not trained, then performing the following:
      saving the extracted features into a data array containing data records accumulated from previous activations of the prognosis analysis program, each data record comprising features extracted during a single activation; and
      only if a number of data records in the data array exceeds a threshold number of records, training the model using the data records;
   using the trained model, determining the prognostic information based on the features;
   providing the prognostic information of the trained model to a user to indicate a need for a maintenance operation on the equipment; and
   after determining the prognostic information, setting the prognostics analysis program status to idle.

2. The method of claim 1, further comprising:
   before reading the predetermined number of data samples, determining that a data acquisition trigger is met.

3. The method of claim 2, wherein the data acquisition trigger is that the equipment is operating.

4. The method of claim 1, further comprising:
   before reading the predetermined number of data samples, determining that a data acquisition trigger is not met;
   in response to determining the data acquisition trigger is not met:
      clearing the buffer; and
      returning to determining whether the prognosis analysis program has an idle status.

5. The method of claim 4, wherein the data acquisition trigger is that the equipment is operating.

6. The method of claim 1, further comprising:
   after reading the data samples from the data buffer to the prognosis analysis program, selecting a most stable window of the data samples for extracting the plurality of features.

7. The method of claim 1, further comprising:
   applying a fast Fourier transform to the window of the data samples to decompose a subject signal into component frequencies and amplitudes.

8. The method of claim 7, wherein the features comprise band energies calculated within equally distributed frequency ranges along a fast Fourier transform spectrum.

9. The method of claim 1, wherein the features comprise a wavelet packet transform representing a signal as a waveform having a finite length or a fast decaying oscillating characteristic.

10. The method of claim 9, wherein the features further comprise energies calculated for all nodes at an end of a decomposition level.

11. The method of claim 1, wherein the features comprise at least one time domain feature selected from the group consisting of: mean, standard deviation, root mean square and kurtosis.

12. The method of claim 1, wherein determining the prognostic information based on the features further comprises using the features as an input to a self-organizing map.

13. A non-transitory computer-readable medium having stored thereon computer readable instructions for determining prognostic information for equipment controlled by a programmable logic controller, using a prognostics analysis program embedded in a software platform of the programmable logic controller, wherein execution of the computer readable instructions by a processor causes the processor to perform operations comprising:
   determining whether the prognostics analysis program has an idle status;
   only if the prognostics analysis program has an idle status, then, by the programmable logic controller during programmable logic controller real-time cycles, reading a predetermined number of data samples from a data acquisition device and writing the data samples to a buffer;
   after writing the predetermined number of data samples to the buffer, activating, by a system function block of the programmable logic controller software platform, the prognostics analysis program to have an active status;
   reading the data samples from the buffer into the prognostics analysis program;
   identifying an operating condition of the equipment based on the data samples from the buffer;
   based on the operating condition of the equipment, extracting a plurality of features from the data samples from the buffer;
   determining whether a model corresponding to the identified operating condition has been trained;
   only if the model corresponding to the operating condition is not trained, then performing the following:
      saving the extracted features into a data array containing data records accumulated from previous activations of the prognosis analysis program, each data record comprising features extracted during a single activation; and
      only if a number of data records in the data array exceeds a threshold number of records, training the model using the data records
   using the trained model, determining the prognostic information based on the features;
   providing the prognostic information of the trained model to a user to indicate a need for a maintenance operation on the equipment; and
   after determining the prognostic information, setting the prognostics analysis program status to idle.

14. A programmable logic controller comprising data acquisition inputs, a prognosis analysis output, a processor and a non-transitory computer-readable medium having stored thereon computer readable instructions for determining prognostic information for equipment controlled by the programmable logic controller, wherein execution of the computer readable instructions by the processor causes the processor to perform operations comprising:
   determining whether a prognostics analysis program embedded in a software platform of the programmable logic controller has an idle status;
   only if the prognostics analysis program has an idle status, then, by the programmable logic controller during programmable logic controller real-time cycles, reading, by the data acquisition inputs, a predetermined number of data samples from a data acquisition device and writing the data samples to a buffer;
   after writing the predetermined number of data samples to the buffer, activating, by a system function block of the programmable logic controller software platform, the prognostics analysis program to have an active status;
   reading the data samples from the buffer into the prognostics analysis program;
   identifying an operating condition of the equipment based on the data samples from the buffer;
   based on the operating condition of the equipment, extracting a plurality of features from the data samples from the buffer;
   determining whether a model corresponding to the identified operating condition has been trained;
   only if the model corresponding to the operating condition is not trained, then performing the following:
      saving the extracted features into a data array containing data records accumulated from previous activations of the prognosis analysis program, each data record comprising features extracted during a single activation; and
      only if a number of data records in the data array exceeds a threshold number of records, training the model using the data records
   using the trained model, determining the prognostic information based on the features;
   providing the prognostic information of the trained model to a user to indicate a need for a maintenance operation on the equipment; and
   after determining the prognostic information, setting the prognostics analysis program status to idle.

* * * * *